United States Patent Office 3,446,977,
Patented May 27, 1969

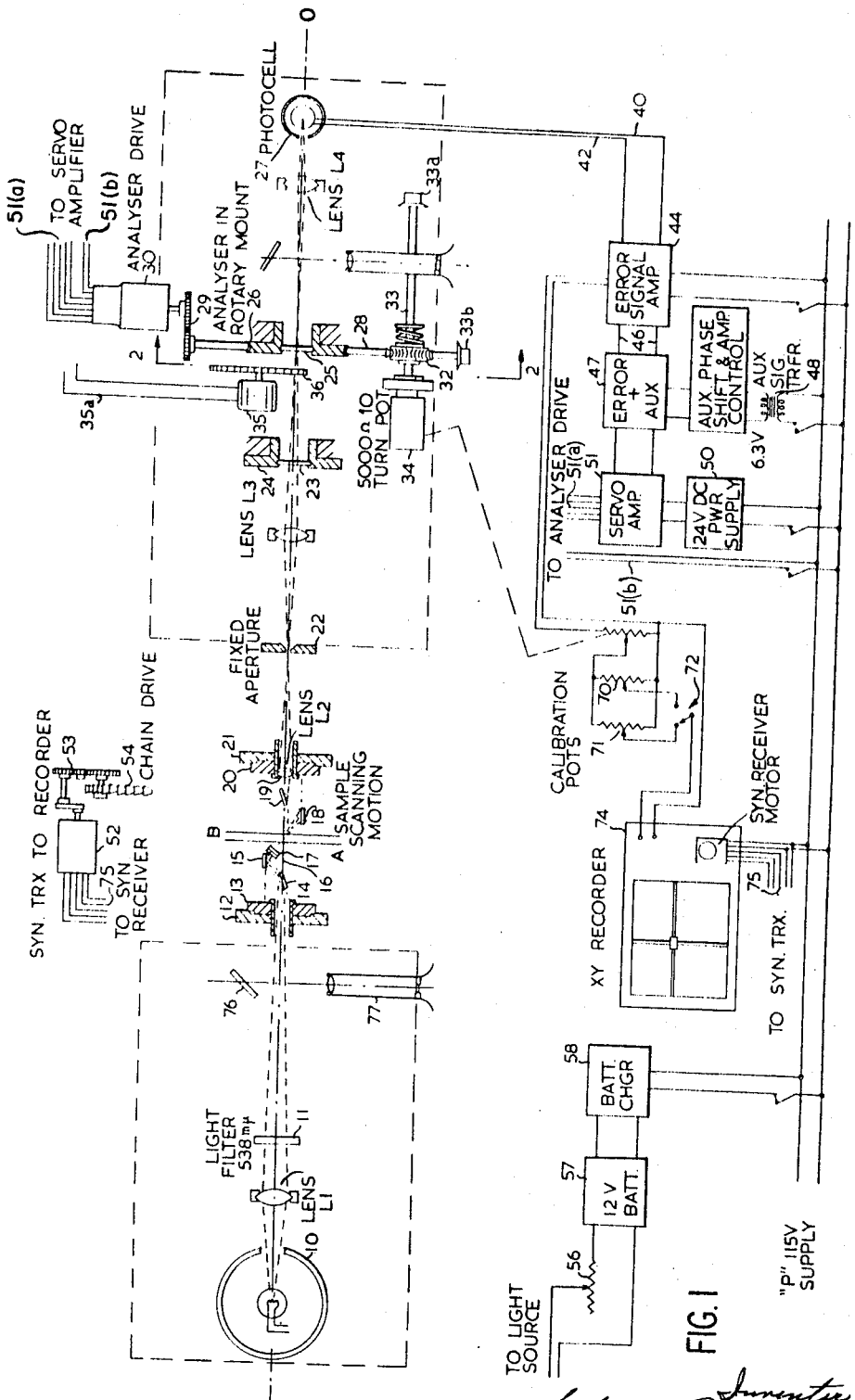

3,446,977
STRESS INSPECTION APPARATUS FOR
TRANSPARENT SHEET MATERIAL
Sydney Bateson, Oshawa, Ontario, Canada, assignor to
PPG Industries, Inc., Pittsburgh, Pa., a corporation of
Pennsylvania
Filed Dec. 27, 1965, Ser. No. 516,405
Int. Cl. G01n 21/30
U.S. Cl. 250—219                              6 Claims

ABSTRACT OF THE DISCLOSURE

Apparatus for detecting and recording stresses and their distribution in a sheet of transparent material. The instrument consists basically of a Senarmont compensator in which the analyzer element is automatically rotated to the balanced position by means of a servo system. In order that the analyzer may rotate in a direction determined by the change of retardation, due to a change from compressive to tensile stress or vice versa, the system provides for a reversal of phase in the signal applied to the servomotor thereby to effect a change in the direction in which the analyzer is driven. This phase reversal is provided by superimposing an auxiliary signal of equal frequency but opposite phase on a fluctuating error signal derived from a light sensitive device which receives light passing through the analyzer. Since the servomotor is capable of responding to a phase shift the direction of rotation of the analyzer is thereby determined by whether the error signal increases or decreases in amplitude relative to the amplitude of the auxiliary signal.

---

This invention relates to a method and apparatus for detecting and recording stresses and their distribution in a sheet of material such as glass.

Stress distribution in glass specimens is commonly examined by visual observation of the photoelastic effects of the stress on the specimen. prior art techniques have varied in complexity from direct viewing through crossed polaroids to measurement by means of calibrated compensators. Since these methods generally require that the condition at each point of interest be visually evaluated and subsequently recorded in a suitable manner, it is apparent that this approach is both time consuming and fatiguing.

An object of the present invention is to provide a system capable of automatically detecting and recording stresses and their distribution in transparent sheet material.

A further object of the invention is to provide a recording photoelastic stress analyzing system capable of distinguishing between positive and negative stresses in a sheet specimen.

The present invention provides an improved photoelastic stress analyzer system which is capable of scanning a selected portion of a sheet specimen with a light beam and which is capable of acting in response to the characteristics of light passing through said specimen to provide an indication of stress distribution and magnitude in the specimen along the selected path of scan and to graphically record said stress.

An important advantage of the invention is that the stress analyzing system is capable of plotting continuous stress distribution through multiple orders of stress while at the same time having regard for the sense of the stress, whether positive or negative.

Figure 4:
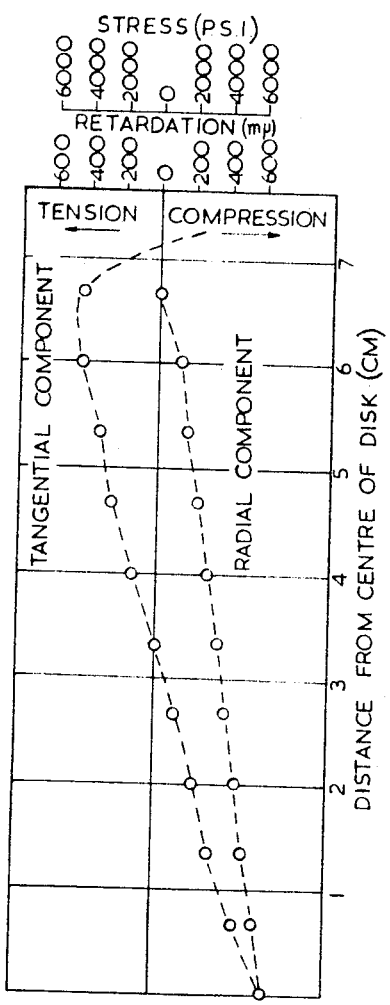
Figure 3:
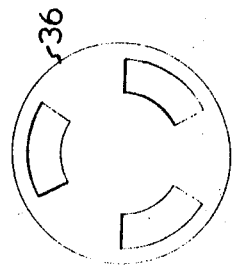
Figure 2:
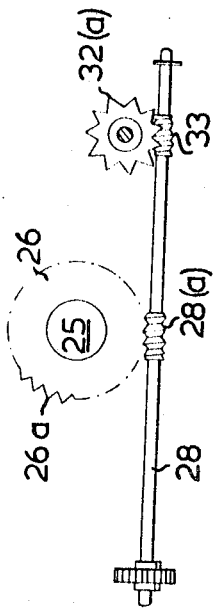
Figure 5:
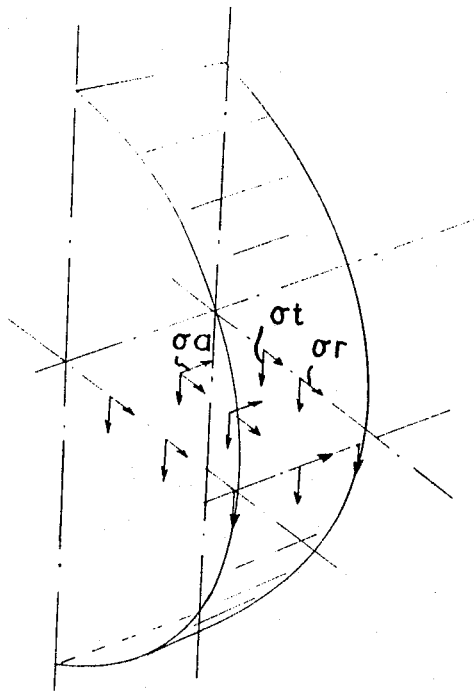
Figure 6:
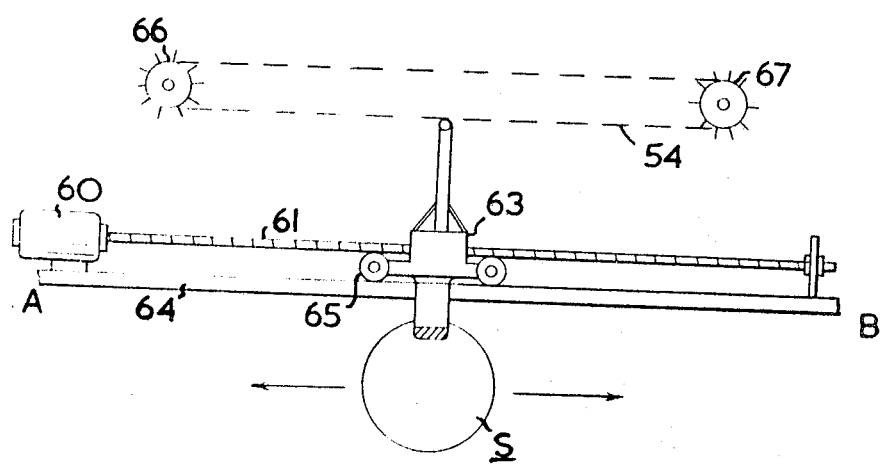

Further aspects and advantages of the invention as well as a fuller understanding thereof may be obtained from the following description read in conjunction with the drawings and in which:

FIGURE 1 is a schematic diagram of the recording photoelastic stress analyzer of the present invention;
FIGURE 2 is a view showing a portion of the means for rotating the analyzer taken along lines 2—2 of FIGURE 1 looking in the direction of the arrows;
FIGURE 3 is a view of a light chopping device;
FIGURE 4 is a diagram illustrating plots recorded by the system of the present invention;
FIGURE 5 is a diagram of the stresses within the specimen from which the plots of FIGURE 4 were recorded.
FIGURE 6 is a view of a scanning frame.

Photoelastic stress analysis is based on the principle that the components of polarized light vibrating in the directions of the principal stresses are relatively retarded in proportion to the difference of the principal stresses. This may be expressed as:

$$R = Ct(p-q) \quad (1)$$

where
R is the relative retardation,
C is the stress optical coefficient,
t is the thickness of the specimen, and
p and q are the principal stress components.

The stress analyzer ssytem of the present invention utilizes the Senarmont principle. This principle is well known in the art and will not be fully discussed here. It is sufficient to state here that the Senarmont system incorporates a light source and an optical system which directs polarized light through the specimen being examined and intercepts the relatively retarded and elliptically polarized light leaving the specimen which is assumed to have stresses therein, and converts the elliptically polarized light to linearly polarized light which is angularly oriented in proportion to the retardation of the light which has arisen by virtue of the stress in the specimen. The linearly polarized light is then intercepted by an analyzer. Since the latter may be angularly oriented to block the linearly polarized light, it is apparent that the changes in relative retardation of the light due to stress changes in a specimen being scanned may be detected by changing the angular position of the analyzer such that the light energy is constantly blocked or alternatively, partially blocked by a constant amount.

The present invention incorporates the system described briefly above in the following manner. A light sensitive tube is placed so as to receive any light passing through the analyzer and the output of the tube (called the error signal) forms part of the input to a servo system which controls the angular orientation of the analyzer. Means are provided to cause the error signal output to fluctuate such that said output may be readily amplified. When the analyzer is not at that angle necessary to provide extinction of the linearly polarized light beam, the light passing therethrough reaches the light sensitive tube causing the latter to emit an error signal which is amplified and introduced to the servo system controlling the position of the analyzer. The amplitude of the error signal is of course, proportional to light intensity. Since a tension stress in the glass retards the light energy in a sense opposite to the retardation introduced by compression stress, it is necessary that the analyzer rotate in a direction determined by the change of retardation if tension stress is to be distinguished from compression stress. The system of the present invention controls the direction of rotation of the analyzer by providing means which operate to reverse the phase of the signal applied to the servomotor and hence the rotation of the latter, in accordance with changes in retardation. The phase reversal referred to amove is accomplished according to the present invention by superimposing on the alternating error signal of the light sensitive tube an auxiliary signal having the same frequency as the latter but having a phase opposite thereto. The resultant of the two signals will therefore be in phase with the greater of the two; that is, an increased error signal yields a resultant in phase with the error signal, while a decrease in the amplitude yields a resultant in phase with the auxiliary signal. The superimposed signals are then applied to the servo-motor controlling the position of the analyzer and the servo will seek a balanced position.

The present invention provides for the recording of the stress distribution in a specimen being scanned by recording the position of the analyzer as a function of distance along a selected path of scan on the specimen. The stress distribution is recorded on an XY recorder the Y displacement of which is proportional to the orientation of the analyzer while the X displacement is driven in synchronism with a sheet specimen being passed through the light beam of the stress analyzer.

The system of the present invention is flexible and is well suited to both normal and oblique incidence methods of analysis. In the normal incidence method the beam of polarized light is directed through the specimen at right angles with the plane of light polarization at 45° to the direction of principal stress. When using the latter method, the analyzer of the present invention gives a plot of relative retardation and hence indicates the variation in the difference of principal stresses as expressed in Equation 1 above.

The oblique incidence methods of analysis utilizes a system of mirrors to cause the polarized beam of light to pass through the sheet specimen at an oblique angle. The incident beam is rotated about one of the stress components. Thus if the incident beam is rotated about the $q$ component to make an angle of incidence of $\theta$ degrees to the $p$ component, Equation 1 becomes:

$$R_A = \frac{Ct}{\cos\theta}(p\cos^2\theta - q) \quad (2)$$

where $t/\cos\theta$ is the extended path length and $p\cos^2\theta$ represents the resolution of the $p$ component ($p\cos\theta$) and rotation of its plane of action through the angle $\theta$.

The magnitudes of $p$ and $q$ may be determined by solving Equation 2 together with that resulting from rotating the incident beam about $p$, thereby obtaining a projected component of $q$. This method leads to the following equations $p$ and $q$ to the measured retardations.

$$p = \frac{\cos^3\theta}{Ct(1-\cos^4\theta)}R_A - \frac{\cos\theta}{Ct(1-\cos^4\theta)}R_B \quad (3)$$

$$q = \frac{\cos\theta}{Ct(1-\cos^4\theta)}R_A - \frac{\cos^3\theta}{Ct(1-\cos^4\theta)}R_B \quad (4)$$

Substitution of the following numerical values in the above equations leads to the appropriate expressions for $p$ and $q$ in pounds per square inch in terms of the retardation $R_A$ and $R_B$ in millimicrons.
where
$\theta = 25°$,
$C = 2.68$ Brewsters, and
$t = \frac{7}{32}$ inch,
$p = 22.0\,R_A - 26.8\,R_B \quad (5)$
$q = 26.8\,R_A - 22.0\,R_B \quad (6)$ These equations permit calculation of the principal stress components, $p$ and $q$, from the retardation measured by the oblique incidence instrument. As is customary in the glass industry, $p$ and $q$ may be expressed in terms of retardation in millimicrons produced by them.

For $t = \frac{7}{32}$ inch
$$R_p = p/9.74$$
$$R_q = q/9.74$$

and Equations 5 and 6 reduce to
$$R_p = 2.26\,R_A - 2.75\,R_B \quad (7)$$
$$R_q = 2.75\,R_A - 2.26\,R_B \quad (8)$$

The two equations give above enable us to calculate principal stress values by subtracting two plots of retardation taken across any particular specimen, the difference being the stress value desired.

Since the oblique incidence method is preferred, the system of the present invention which will be more fully described hereinafter is particularly adapted to carry out this method. It should be realized, however, that with suitable modifications thereto that the system may carry out normal incidence analysis as well.

To illustrate the above point, reference is made to the oblique incidence optical unit designated in FIGURE 1. By simply removing the oblique incidence unit and replacing same with a single polarizer plate positioned normal to the optical axis of the system, the system is enabled to carry out normal incidence analysis. The path of scan for normal incidence analysis is, of course, normal to the optical axis of the system and passes between the polarizer and the fixed aperture 22.

Referring particularly to the drawings there is seen in FIGURE 1 an optical system having an optical axis O—O. At one end of the optical axis is located a tungsten lamp (10) which receives a constant supply of D.C. power from a battery 57, the potential at lamp 10 being regulated by means of the rheostat 56. A charger 58 operating from a 115 v. 60 cycle A.C. supply keeps the battery at constant potential.

The white light emitted from the lamp 10 passes through a lens L1 located on the optical axis and is focused on the specimen which is to be scanned and which is located on the path A–B. The beam of light converging from lens L1 is rendered monochromatic before reaching the specimen by means of a 538 millimicron interference filter located on the optical axis between the lens L1 and the sample.

Immediately before reaching the sample the light beam is deviated first by mirror 14 and thereafter by mirror 15 such that the light reflected off mirror 15 cuts across the optical axis at an oblique angle. Mirrors 14 and 15 conveniently have aluminized surfaces and they are mounted by suitable brackets upon a disc 13 which is rotatably mounted in a bushing 12, thereby providing for rotation of the mirrors 14 and 15 about the optical axis O—O. Also mounted on the disc 12 and in and normal to the path of the light reflected from mirror 15 towards optical axis O—O is a polarizer 16 and a quarter wave plate 17. The polarizer 16 is oriented such that the light is linearly polarized at 45° to the plane of incidence of the light reflected off mirror 15. Quarter wave plate 17 subsequently circularly polarizes the light just before the light converges and enters the specimen on path A–B. The beam leaving the specimen is elliptically polarized due to the relative retardation produced by stresses in the sample. A second mirror system comprising mirrors 18 and 19 deviates the light beam leaving the sample back to the optical axis O—O changing slightly the elliptical polarization. Mirrors 18 and 19 are mounted for rotation about the optical axis in the same manner as are mirrors 14 and 15, that is, they are mounted on disc 20 by brackets (not shown) and disc 20 is rotatably mounted in bushing 21.

The rotatable mounting assembly for mirrors 14, 15, 18 and 19 permits the whole mirror system to be rotated about the optical axis such that the mirrors may be placed in parallelism with the principal stresses in the specimen.

The light, which has now been deviated back to the optical axis is passed through lens L2 which is mounted on the optical axis within a bushing 21 about which disc 20 rotates. Lens L2 serves to focus the light beam upon a fixed aperture 22 which restricts the field of view. The light beam then passes through a further lens L3 and is converging as it passes through a second quarter wave plate 23 which is located in an adjustable mount 24. Quarter wave plate 23 is oriented with its axis parallel to the axis of the elliptically polarized light.

Quarter wave plate 23 serves to linearly polarize the light beam and the linearly polarized light is angularly displaced from the initial plane of polarization by an amount proportional to the retardation introduced by the stresses within the specimen.

The linearly polarized light then passes through an optical analyzer plate 25 (a plane polarizing plate) and thence through lens L4 which serves to focus the light beam on a photocell 27. Analyzer 25 will pass linearly polarized light except when the light is oriented in line with the extinction position of the analyzer. As the linearly polarized light is displaced from this extinction position of the analyzer the amount of light transmitted increases rapidly with respect to the displacement to a maximum value.

Interposed between the quarter wave plate 23 and the analyzer 25 is a light chopping disc 36 which is mounted for rotation on shaft 39 of chopper motor 35. Shaft 39 is parallel to and offset from, the optical axis O—O. Chopping disc 36 has three cut-out segments 37, 38, and 39 therein with the edges of the segments being radii of the chopper disc, each segment subtending 60° of arc, and being equally spaced about the disc. Chopper motor 35 which receives power from source P through lines 35a is of the synchronous type, such that the segmented chopping disc 36 is always driven at constant speed. Therefore as disc 36 is rotated, light passing along the optical axis is admitted to the photocell 27 only when the cut-out portions 37, 38 and 39 pass through the optical axis.

For reasons which will be apparent it is necessary that the light fluctuation be in phase with the line voltage from power source P. The chopping disc 36 described above gives a waveform which is substantially sinusoidal in nature, and the phase of the light fluctuation is synchronized with the phase of the line voltage by rotating chopper motor 35 about shaft 39 until the desired synchronism is achieved. Since disc 36 has 3 segments it will be apparent that chopper motor must have a speed of rotation of 1200 r.p.m. to achieve a 60 cycle per second light fluctuation. Since the output of photocell 27 is in phase with the light input thereto, it is apparent that photocell 27 will have an output signal (hereinafter called the error signal) which is substantially sinusoidal in form and in phase with the line voltage from power source P.

The analyzer 25 previously referred to is mounted for rotation about the optical axis, and is driven by a servomotor 30 receiving signals from an electrical system to be more fully described. Referring to FIGS. 1 and 2, analyzer 25 is secured within a ring 26 having teeth 26-(a) about the periphery thereof. Ring 26 is journalled for rotation in a mount bushing 25a. Teeth 26(a) on ring 26 are engaged by a worm gear 28a on shaft 28, the latter being driven by servomotor 30 through gear train 29. A second worm gear 33 on shaft 28 engages with toothed gear 32(a) with the latter driving a multiturn potentiometer 34 through a second shaft 32. Adjustment knobs 33a and 33b are provided for manual indexing of the potentiometer 34 and the analyzer 25. It is therefore seen that rotation of servomotor 30 causes corresponding rotation of analyzer 25 and potentiometer 34.

Servomotor 30 has a first input connected directly to source P through leads 51(b) and a second input connected to an amplifier 51 through leads 51(a). The amplifier 51, in turn, receives signals from the following system. The photocell 27, as explained previously, emits an error signal in phase with the line voltage from source P and has an amplitude proportional to the light intensity. This error signal is fed into an amplifier 44 (which amplifies the A.C. component of the error signal) via leads 40 and 42 and the amplified signal is then fed into a unit 47 which combines the amplified error signal with an auxiliary signal, the latter having a phase opposite to the phase of said error signal. The auxiliary signal has its source at power source P and is reduced to about 6.3 volts by auxiliary signal transformer 48. The low voltage signal is then fed into a phase shifting unit 49. The auxiliary signal which has the same frequency as the error signal (line frequency) is controlled by the phase shift unit 49 such that said signal is exactly opposite in phase to the error signal with amplitude about one-half the amplitude of the maximum error signal. When the error and auxiliary signals are combined in unit 47, the resultant signal will be in phase with the signal having the greater amplitude. The resultant signal is then fed into the servoamplifier 51 referred to previously. The servomotor 30 may be a Muirhead Type 18M 10D9 Servomotor in conjunction with amplifier 51 (e.g., a Muirhead Type D-985-A Servoamplifier), the latter requiring a 24 volt D.C. power supply 50. The direction of rotation of servomotor 30 is determined by the phase of the resultant signal with respect to the line signal. If the error signal from photocell 27 is equal in amplitude to the amplitude of the auxiliary signal, the signals cancel each other (the resultant will be zero) and the servomotor will stop i.e., the servo system will be at its balanced position. Should the error signal increase or decrease in amplitude relative to the auxiliary signal due to a change in the retardation angle of the light passing through the analyzer 25, the servomotor 30 will respond to the shift in phase of the resultant signal by rotating the analyzer 25 to decrease or increase the amount of light passing through the latter until sufficient light is received by photocell 27 such that the amplified error signal equals in amplitude the auxiliary signal (i.e., until the balance point is reached). The balance position of the analyzer will therefore be offset from the extinction position by an amount proportional to the amplitude of the auxiliary signal and servomotor 30 will rotate in a direction determined by the phase of the resultant signal with respect to the line signal from source P should the system become unbalanced.

As stated previously, the light received by the analyzer is linearly polarized and its orientation angle varies in accordance with variations in retardation which have taken place in the specimen by virtue of stress variations in the latter. Since the analyzer is continually moved to the balance point in accordance with changes in the orientation angle of the light received by it, a plot of the motion of the analyzer gives picture of the stresses within the specimen.

The stress distribution within a specimen is recorded on an XY recorder, the Y displacement of which is proportional to the orientation of analyzer 25, while the X displacement is driven in synchronism with the movement of the sheet specimen as the latter moves along the scanning path A–B.

The voltage supply for the XY recorder 74 (Houston model with modified drive) is conveniently taken off from the error signal amplifier 44 and fed through the multi-turn potentiometer 34 (preferably 10 turn 5000 ohm) coupled to the analyzer. The voltage output of the potentiometer 34 is tapped by either one of two calibration potentiometers 70 or 71 which are selected by a calibration selector switch 72 and said output is then fed into the Y input of the recorder.

The X displacement of recorder 74 is driven preferably by a synchronous transmitter 52 the output of which is fed via leads 51 to synchronous receiver 59, on the recorder 74. A Muirhead Synchro Transmitter Type 23 TX6a in conjunction with a Muirhead Sychro Receiver Type 23TR6a were found to give satisfactory results for the above operation. The transmitter 52 is driven through gear train 53 by a chain drive 54 which moves in accordance with the motion of a scanning frame. The scanning frame is illustrated schematically and includes a carriage 63 from which the specimen S to be scanned is suspended. Wheels 65 permit carriage 63 to roll smoothly along tracks 64 which are positioned parallel to the scanning path A–B. A motor 60 rotates a threaded shaft 61 and the latter engages carriage 63 and propels it along tracks 64 at a desired rate of speed. Switches (not shown) may be used to reverse motor 60 to drive the carriage 63 and specimen S in either direction. A continuous chain 54 is brought around a pair of sprockets 66, 67 one of the latter being connected to the gear train 53. The chain is fixed to the carriage, such that movement of the carriage moves the chain and sprockets hence causing corresponding movement of the synchronous transmitter 52 which, in turn, sends a signal to receiver 59 and drives the X displacement of the recorder 74.

Thus as the scanning carriage 63 moves specimen S along path A–B through the field of view of the optical system, the X displacement of recorder 74 is driven in synchronism therewith and at a rate proportional thereto. The Y displacement will be proportional to the voltage output of potentiometer 34 and will indicate the orientation of analyzer 25.

By the above means a record of the analyzer orientation and hence retardation in the specimen being scanned as a function of distance along the direction of scan is obtained.

In order to obtain the principal stesses by the method of oblique incidence, two plots of retardation along the specimen must be obtained in order to solve Equations 5 and 6 simultaneously. By means of the rotating mirror system described earlier, two retardations at the same point on the specimen can be measured.

Assuming that the specimen that is to be analyzed is a flat disc, the first step is to determine the direction of the first and second principal stresses therein. This may be done by isoclinic examination. The specimen is then placed in the scanning carriage and the mirror system, i.e., mirrors 14, 15, 18 and 19 are rotated about the optical axis until they are in parallelism with one of the principal stresses. The quarter wave plate is oriented as described earlier. Since the specimen is circular it is desirable to scan from the center of the disc outwardly. The first scan is then made utilizing one of the calibration potentiometers, i.e., 70. A second scan is made with the mirrors parallel to the second principal stress using the second calibration potentiometer 71. By subtracting the two curves thus obtained the principal stress along the path of scan may be found. The calibration potentiometers will be set at values corresponding to the value of the constant terms in the two equations given previously. For example, in determining the $q$ component the potentiometers will be set relative to one another such that they represent the numerical values 22.0 and 26.8 respectively. The second principal stress is found from two additional scans made in similar fashion with the calibration potentiometers reversed, and with their settings in accordance with the constant terms in the equation being considered.

In order that successive scans may be started from the same point, a telescope 77 is provided, which along with mirror 76 enables viewing of the sample and the fixed aperture 22 along the path of the light beam.

FIGURE 4 is a graph illustrating application of the oblique incidence technique in determination of the individual components $p$ and $q$, which in this instance represents the value of the tangential and radial stress components, along a radius of a circular disc, as a function of distance from the centre of the disc. Each curve was obtained by subtracting the plots obtained by the method described above.

FIGURE 5 illustrates the stresses within the specimen from which the plot of FIGURE 4 was obtained. Since the method assumes a two-dimensional stress system only the radial stress component $\theta_r$ and the tangential stress component $\theta_t$ are detected. It will be noted here that the method described assumes that the direction of the principal stress components is constant within the area examined. Furthermore the stress gradient must not exceed that which can be resolved within the field of view of the instrument, since complete extinction within the field must be obtained if the system is to reach a balance point.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A device for analyzing the stresses in a transparent sheet of material comprising; means for moving said sheet material along a selected path, means for directing a beam of polarized light at a selected angle to the surface of said moving sheet with at least a portion of the light beam passing through said sheet being elliptically polarized in response to stresses in the sheet, optical means converting the elliptically polarized light emanating from the sheet to a linearly polarized beam, said linearly polarized beam having an angular orientation which varies in accordance with changes in the magnitude of the stress in said sheet material, optical analyzer means mounted to intercept the linearly polarized beam, said analyzer being rotatable between a position wherein the linearly polarized light is extinguished and another position wherein at least a portion of the linearly polarized light is passed therethrough, with the intensity of the transmitted light being proportional to the degree of displacement between said another position and the extinction position of said analyzer, a servomotor for rotatably driving said analyzer, light sensitive means positioned to receive light transmitted through said analyzer and emitting an error signal having magnitude proportional to the intensity of the light received thereby, means causing said error signal to fluctuate, means producing and superimposing on said error signal a fluctuating auxiliary signal having a frequency equal to the frequency of the error signal and a phase opposite thereto, and means feeding the resultant of said superimposed signals to said servomotor, said resultant signal being in phase with the greater one of said superimposed signals, said servomotor being adapted to rotate in a direction determined by the phase of the resultant signal fed thereto and to seek a null position whereby the analyzer is rotated in accordance with the changes in the orientation of said linearly polarized light in a direction to distinguish tension from compression stresses in said material.

2. The device as set forth in claim 1 including means for recording the angular position of said analyzer as a function of the amount of movement of the sheet material along said path.

3. The device of claim 1 wherein the means causing said error signal to fluctuate comprise a device periodically interrupting the light entering the light sensitive means.

4. A device for analyzing stress in a transparent sheet of material comprising; conveyor means for moving said sheet along a selected path, means directing a beam of initially polarized light through the moving sheet of said material at a selected angle to the surface thereof, optical means converting the elliptically polarized light components passing through said sheet to a linearly polarized light beam which is angularly disposed in accordance with the stress in the sheet, an optical analyzer mounted in the path of said linearly polarized beam and being rotatable between a position wherein the linearly polarized beam is extinguished and another position wherein at least a portion of the linearly polarized beam is transmitted with an intensity proportional to the degree of angular displacement between said another position and the extinction position of the analyzer, means for causing the transmitted light to fluctuate, means receiving the fluctuating light and being responsive thereto and emitting a fluctuating error signal having amplitude proportional to the intensity of said fluctuating light, means producing an auxiliary signal of constant amplitude and phase opposite to the phase of said error signal, means superimposing said error signal and said auxiliary signal to produce a resultant signal, a servomotor, means feeding the resultant of the superimposed error and auxiliary signals to said servomotor, the latter being adapted to rotate in a direction determined in accordance with the phase of the resultant signal, the servomotor being operably connected to said analyzer and acting on command of said signal to decrease or increase said degree of angular displacement by rotating said analyzer to continually seek a balanced condition wherein the intensity of said transmitted light approaches a preset value, whereby any change in the orientation of said linearly polarized beam causes a proportional change in the angular position of said analyzer, and means recording the angular position of said analyzer as a function of sheet movement thereby giving an indication of stress in the sheet material.

5. The device of claim 4 wherein said means causing the transmitted light to fluctuate comprises a segmented disc mounted for rotation adjacent the path of the light resultant passing to said analyzer, and means rotating said disc such that said light resultant is periodically interrupted.

6. The device of claim 4 wherein the means recording the angular position of said analyzer further includes means sensitive to the movement of said sheet, and emitting a signal in response thereto, and means feeding said signal to the means recording the angular position of the analyzer, said latter means receiving said signal and producing a plot of analyzer position versus sheet movement.

References Cited

UNITED STATES PATENTS

| | | | |
|---|---|---|---|
| 1,874,217 | 8/1932 | Arberry | 88—14 |
| 1,974,598 | 9/1934 | Boggs | 88—14 |
| 2,046,045 | 6/1936 | Walters | 88—14 |
| 2,976,764 | 3/1961 | Hyde et al. | 250—225 |
| 2,993,402 | 7/1961 | Dunipace et al. | 250—225 |
| 3,124,637 | 3/1964 | Heitzer | 250—225 |
| 3,158,675 | 11/1964 | Murray et al. | 250—225 |
| 3,274,882 | 9/1966 | Kreiger et al. | 250—225 |

JAMES W. LAWRENCE, *Primary Examiner.*

DAVID O'REILLY, *Assistant Examiner.*

U.S. Cl. X.R.

88—14; 250—224, 225